United States Patent [19] [11] 3,911,460
Lasky et al. [45] Oct. 7, 1975

[54] APPARATUS AND METHOD FOR AUTOMATICALLY PROCESSING A BATCH OF PHOTOGRAPHIC ELEMENTS

[75] Inventors: Daniel J. Lasky, Sunnyvale; Allen T. Puder, Los Altos; Philip Richard Wright, San Jose; George Oiye, Los Altos, all of Calif.

[73] Assignee: ILC Technology, Inc., Sunnyvale, Calif.

[22] Filed: Aug. 20, 1974

[21] Appl. No.: 499,049

[52] U.S. Cl. .................................. 354/328; 354/299
[51] Int. Cl.[2] ............................................ G03D 3/04
[58] Field of Search ............ 354/324, 328, 297, 299

[56] References Cited

UNITED STATES PATENTS

| | | | |
|---|---|---|---|
| 3,733,993 | 5/1973 | Lasky | 354/328 |

*Primary Examiner*—Monroe H. Hayes
*Attorney, Agent, or Firm*—Schatzel & Hamrick

[57] ABSTRACT

An apparatus and method for simultaneously processing a plurality of photographic elements which are mounted in a rack and have an emulsion layer with exposed areas. The apparatus comprises a processing station having a processing tank for holding a supply of processing fluid. A first electrode is positioned within the tank so as to define a horizontal plane. The first electrode is adapted to support the rack when the photographic elements are immersed within the fluid and for connection to a direct current source. A second and a third electrode are mounted within the processing tank and spaced apart relative to one another so as to define second and third planes which are substantially perpendicular to the first plane and to the plane of the elements. The second and third electrodes are adapted to receive a potential of opposite polarity to that applied to the first electrode. The processing station further includes a liquid level sensor for use in automatically filling the tank to a predetermined value and a drain sensor which functions to turn off a pump used to drain the tank. In addition, the apparatus may include a chemical supply station and a temperature control unit to provide an automatically controlled supply of concentrated and mixtures of chemicals at preselected temperatures to fluid valves at a chemical mixing station of the processing station.

14 Claims, 12 Drawing Figures

APPARATUS AND METHOD FOR AUTOMATICALLY PROCESSING A BATCH OF PHOTOGRAPHIC ELEMENTS

BACKGROUND OF THE INVENTION

1. Field of the Invention

The present invention relates generally to the field of processing photographic masks, and more particularly to a system and method for automatically batch processing photographic masks.

2. Description of the Prior Art

The role of photography in the microelectronics or printed circuit industry has taken on new dimensions as the industry has expanded. Integrated circuit technology is ever posing greater demands upon photography, requiring, for example, photographic masks for producing etched circuits having line width tolerances held to previously unattainable limits. The tolerance problem is critical since inaccuracies of the mask patterns are reflected by magnified inaccuracies on the integrated circuits.

A brief summary of photographic processing will quickly point out some of the difficulties in close tolerance developing. The conventional photographic processing involves immersing a photographic element having an emulsion layer that contains, for example, silver halide grains, to a developing bath and thereafter to fixing and washing baths. The mechanism of the most common developing reaction, i.e., the so-called chemical process, involves the reduction of silver ions to metallic silver by a suitable reducing solution or developer. As developing occurs (which is, in fact, an oxidation-reduction mechanism), negatively charged waste particles are released into the developer, such as chloride, bromide, or iodized salts. These salts accumulate adjacent the exposed areas of the emulsion layer and repress or inhibit development by preventing the access by additional, fresh developer to the exposed areas. This condition is unacceptable as it leads to nonuniform development, and thus leads to nonuniformity in line width in the pattern developed on the photographic element. The condition has been alleviated, in part, by the use of various agitation arrangements that attempt to convey fresh developer to the exposed areas of the emulsion layer.

It has been found that agitation of the developer solution during the development operation is necessary for a controlled process. In the prior art, a photographic development process and apparatus is available that utilizes electrophoresis and electrolysis to obtain nonmechanical, and image dependent agitation of a developer bath. An example of the method and apparatus is found in U.S. Pat. No. 3,615,515, entitled "Photographic Processing Method Utilizing Electrophoresis and Electrolysis of the Developer," and in U.S. Pat. No. 3,733,993, entitled "Apparatus for Developing Photographic Materials," both invented by Daniel J. Lasky. As taught in the patents, an electrode screen or grid is mounted in a processing tank on the side of a photographic plate parallel to its exposed emulsion layer and connected to a source of positive direct current potential. A second electrode is mounted in the tank adjacent the lower end of the plate. Because of the placement of these electrodes, only one plane of emulsion surfaces may be processed at a time. Consequently, the costs of processing photographic plates due to the labor and time involved in addition to the quantities of chemicals required is relatively expensive.

SUMMARY OF THE INVENTION

It is therefore an object of the present invention to provide an apparatus for automatically and simultaneously processing batches of photographic plates.

Another object of the present invention is to provide a compact apparatus for economically and automatically processing photographic plates in which chemicals are automatically mixed, and chemical usage is conserved.

Briefly, the present invention is directed toward an apparatus and method for simultaneously processing a plurality of photographic elements which are mounted in a rack and have an emulsion layer with exposed areas. The apparatus comprises a processing station having a processing tank for holding a supply of developer fluid. A first electrode is positioned within the tank so as to define a first plane substantially parallel to the surface of the fluid. The first electrode is adapted to support the rack when the photographic elements are immersed within the fluid whereby negatively charged waste particles are produced at image sites of the emulsion surface as the element undergoes the development processing. The first electrode is also adapted for connection to a direct current source for electrolyzing the fluid and releasing hydrogen bubbles from beneath the elements. The bubbles serve to gently dislodge the negatively charged waste particles. A second and a third electrode are mounted within the processing tank and spaced apart relative to one another so as to define second and third planes which are substantially perpendicular to the first plane and to the plane of the elements.

When a direct current source of a polarity opposite to that applied to the first electrode is connected to the second and third electrodes, the second and third electrodes attract the dislodged negatively charged waste particles away from said emulsion surface. Thus, the fluid in the neighborhood of the emulsion surfaces of the plurality of photographic elements is continually refreshed. The processing station further includes a liquid level sensor for use in automatically filling the tank to a predetermined value and a drain sensor which functions to turn off a pump used to drain the tank.

In addition, the apparatus may include a chemical supply station and a temperature control unit to provide an automatically controlled supply of concentrated and mixtures of chemicals at preselected temperature to fluid valves at a chemical mixing station of the processing station. The fluid valves may be in the form of pneumatic valves which are controlled by gas pressure. Thus, the flow of chemicals through the fluid valves may be controlled by a controlled pressure of gas.

An advantage of the present invention is that it automatically and simultaneously processes batches of photographic plates.

A further advantage is that the photographic plates may be of varying sizes.

Other advantage of the present invention include its provision for realizing a processing station of compact size, and that it provides for reduced labor and material costs in the processing operations by providing for automatic mixing of the chemicals used in processing the photographic plates.

Other objects and advantages will be apparent to those skilled in the art after having read the following detailed disclosure which makes reference to the several figures of the drawing.

IN THE DRAWING

DESCRIPTION OF THE PREFERRED EMBODIMENT

Figures 1, 2:
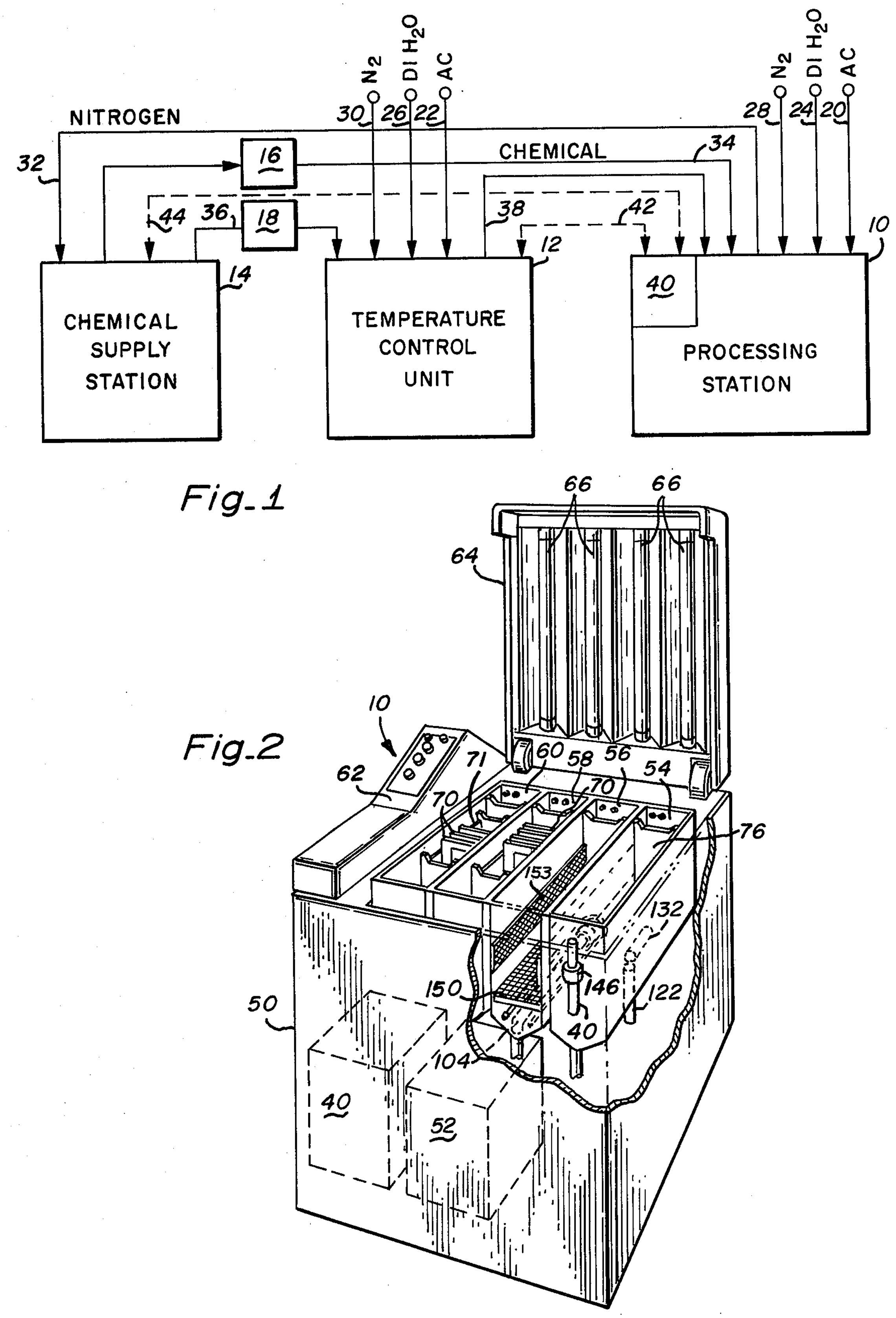
FIG. 1 is a schematic diagram of a system for processing photographic masks in accordance with the present invention.
FIG. 2 is a perspective view of a processing station in accordance with the present invention, with portions broken away for clarity, for processing photographic masks.

A system for processing photographic plates in accordance with the present invention is illustrated in FIG. 1 in a schematic view. As shown the system comprises a processing station 10, a temperature control unit 12, a chemical supply station 14, and a pair of filters 16 and 18. A pair of electrical lines 20 and 22 for carrying alternating current (AC) power are respectively connected to the processing station 10 and temperature control unit 12. A pair of hoses 24 and 26 for reciving a supply of deionized water ($DiH_2O$) are respectively connected to the processing station 10 and temperature control unit 12. Nitrogen gas ($N_2$) may be delivered from an external supply source by means of a pair of hoses 28 and 30 to the processing station 10 and the temperature control unit 12, respectively. In operation, the processing station 10 supplies nitrogen to the chemical supply station 14 through a conduit 32. The processing station 10 receives liquid chemicals from the station 14 through a conduit 34. Chemicals are also transferred from the chemical supply station 14 to the temperature control unit 12 through a conduit 36 and from unit 12 to station 10 through a conduit 38. The filters 16 and 18 are connected in the conduits 34 and 36 to prevent contaminants from entering the processing station 10. The processing station 10 includes an electrical controller, or computer, 40 to generate and transfer appropriate electronic control signals through a pair of electrical conductive lines 42 and 44 to control the supply and transfer functions of chemicals within the system.

Referring to FIG. 2, the processing station 10 is illustrated in a perspective view. The processing station 10 is housed within a rectangular box-like enclosure 50. The enclosure 50 houses the electrical controller 40, a hydraulic system 52 and four sectors, or processing tanks, 54, 56, 58 and 60. An operator control panel 62 is mounted about the top side. A cover 64 is hinged to the enclosure 50 over the four sectors 54, 56, 58 and 60 in a manner to prevent light from entering the interior of the sectors when the cover is closed. A plurality of fluorescent lights 66 are mounted on the underside of the cover 64 such that when the cover is closed the lights are aligned over each of the sectors 54–60. The lights 66 provide for selective exposure, if desired, of a plurality of photographic plates 70 positioned within the sectors 54–60. Selective exposure may be desired, for example, in a chemical reversal process.

The sectors 54–60 are each of the same general configuration and define a processing tank that is of rectangular shape and adapted to receive a plurality of the plates 70. FIGS. 3–6 more particularly define the sector 54 which is adapted to receive a rack 71 carrying a plurality of the photographic plates 70. The illustrated rack 71 is commercially available and commonly used to support plates. The racks 71, as used in the trade, vary in size depending upon the size of the plates 70 to be supported thereby. Typically, the illustrated plates 70 are high resolution photographic glass plates used in integrated circuit fabrication to produce masks. As illustrated, the station 10 has been found capable of accepting plates 70 of dimensional sizes ranging from 2 inches by 2 inches to 4 inches by 5 inches. Large batches of plates may be simultaneously positioned within each of the sectors 54–60 for processing. The number and size of plates may vary in accordance with the number and size of the sectors within the processing station.

Figure 3:
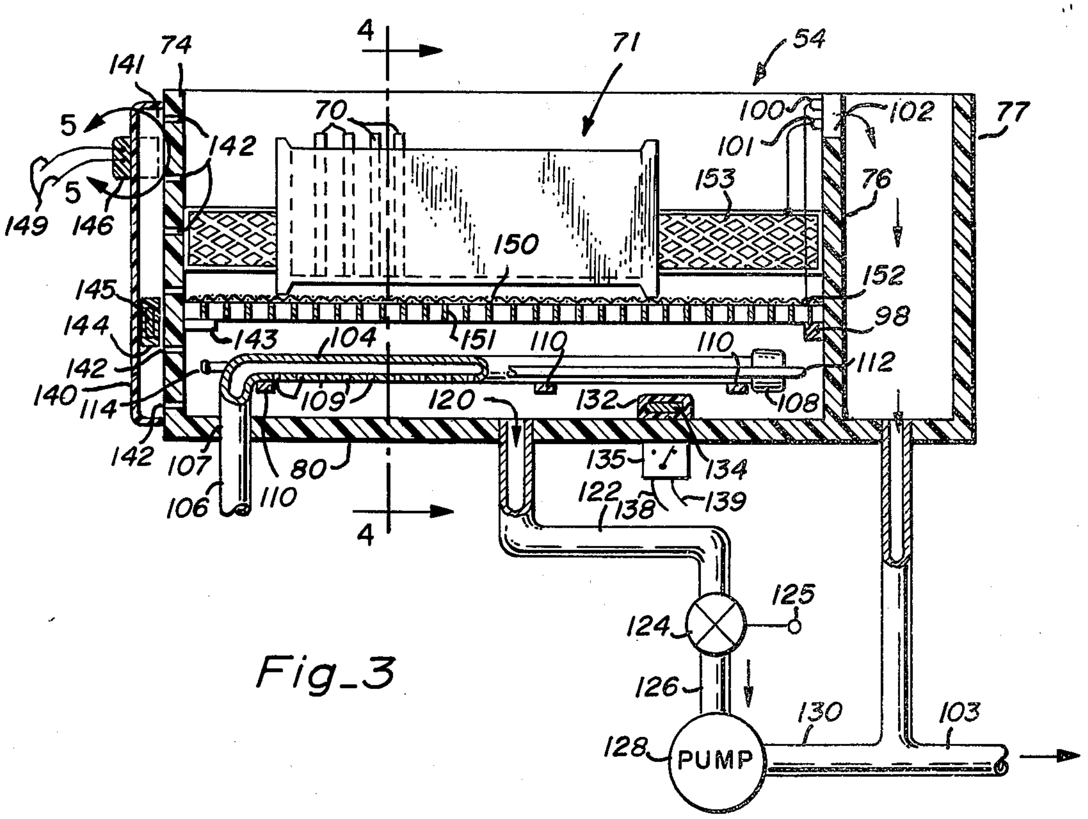
FIG. 3 is a cross-sectional side elevation view of one of the sectors of the processing station of FIG. 2.
Figure 4:
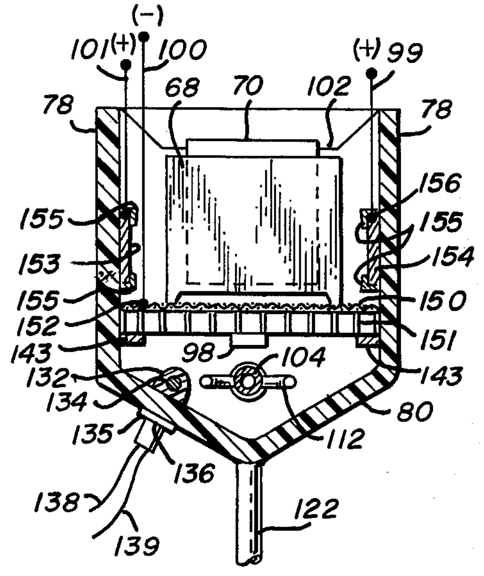
FIG. 4 is a cross-sectional front elevation view of the sector of FIG. 3 taken along the line 4—4.
Figure 6:
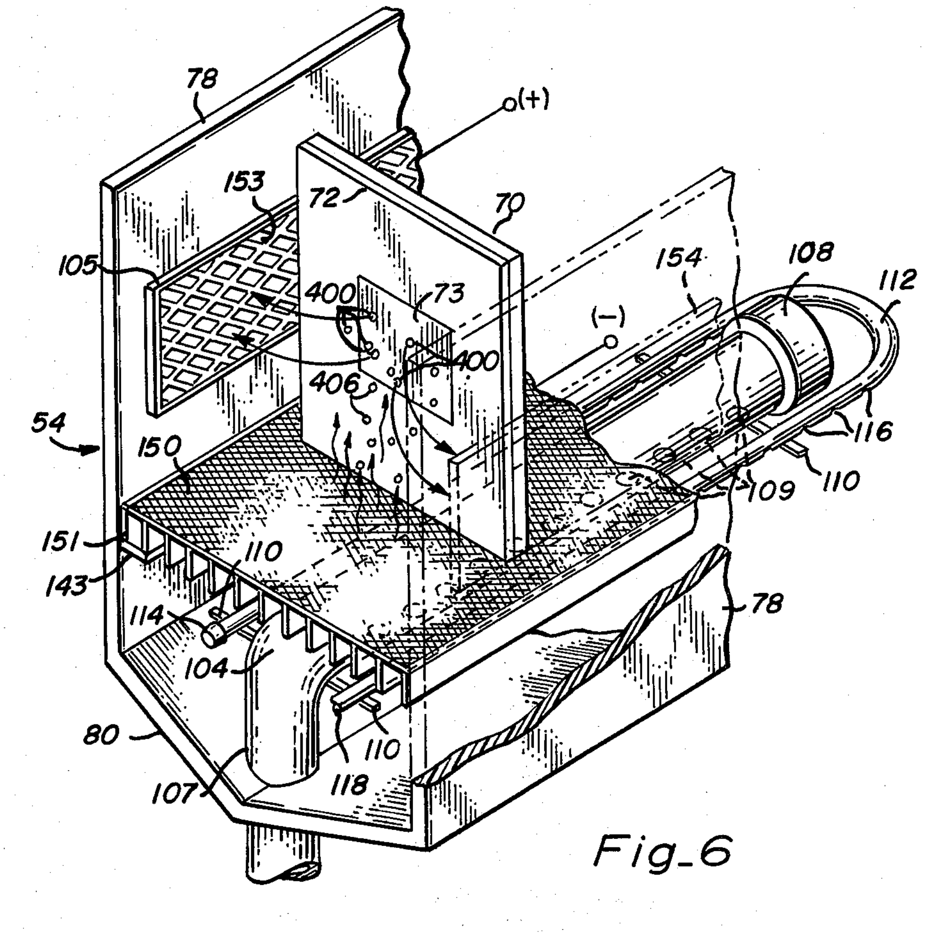
FIG. 6 is a schematic diagram of a photographic plate mounted in the sector of FIGS. 3–4 depicting how agitation is provided by electrophoresis and by nitrogen bursts.

In practice, each of the plates 70 has an emulsion layer 72 on one face. The layer 72 normally carries silver halide grains and is exposed to define an image 73 as schematically illustrated in FIG. 6. The image 73 is generally comprised of a plurality of horizontal and vertical lines corresponding to the pattern of the circuit required. When used for production of integrated circuits, the developed plates serve as integrated circuit masks. In such production, it is important that the lines of each mask be extremely uniform in dimensions. Moreover, because of the economics of business, it is highly desirable to be able to simultaneously develop a plurality of plates of varying sizes. In the illustrated embodiment of the processing station 10, each of the four sectors 54–60 are similar construction. For purposes of clarity only the structure of the sector 54 will be described in detail. Subsequently in describing the hydraulic system, those components of sector 54 defined by numerals which are the same for the sectors 56, 58 and 60 will be distinguished by a letter designation accompanied by the same numerals. Those components of sector 56 will be distinguished by an A, those components of sector 58 by a B, and those of sector 60 by a C. Referring to FIGS. 2–4, the sector 54 includes a planar front wall 74, a planar spillway wall 76, a planar rear wall 77, a pair of planar side walls 78, and a V-shaped floor 80, all formed from an inert material, such as a high impact vinyl with chemical resistance to the fluids utilized in the processing steps. Preferably, the color of the working surface of the walls is selected to take advantage of red light darkroom lighting. The spillway wall 76 includes a stop 98 near the bottom thereof. A set of electrical terminals 99, 100 are supported by the wall 76 to receive a DC voltage supply. The height of portions of the spillway wall 76 is less than that of the front wall 74 and the side walls 78 so as to define a weir 102. Conseqently, when the sector 54 is filled with fluid to a level above the height of the weir 102, the fluid spills into a spillway formed between the spillway wall 77 and the rear wall 77, from where it is carried by gravity to a main drain 103. A pair of keepers 105 are engaged to and extend inwardly from each of the side walls 78 (see FIG. 4) to support a screen electrode as hereinafter described.

A liquid distribution tube 104 is positioned adjacent to the bottom wall 80 and extends intermediate the front wall 74 and the spillway wall 77. The tube 104 is connected to a pipe 106 which extends through an opening 107 in the floor wall 80. The tube 104 is capped at its distan end by a cap 108 and comprises a plurality of liquid distribution apertures 109 to permit liquids to be dispersed to within the formed tank. Extending outwardly from the tube 104 are three supports 110 which serve to support a flexible gas hose 112. The hose 112 is capped at one end by a cap 114 and includes a plurality of apertures 116 which are substantially equally spaced from one another to permit gas to be dispersed to within the formed tank. The other end of the hose 112 carries a coupling 118 adapted to be connected to a source of nitrogen gas so as to provide nitrogen burst agitation through selected liquid chemicals contained in the sector 54 during one or more of the processing operations.

Each of the sectors 54–60 as a drain aperture 120 (see FIG. 3) disposed through the floor 80 to permit drainage of liquids from within the tank. A hose 122 connects the drain aperture 120 to a drain control valve 124. The valve 124 is a pneumatic activated valve responsive to gas received at an inlet port 125. Another hose, or conduit, 126 connects the drain control valve 124 to a pump 128, in turn connected by a hose 130 to the main drain 103.

Affixed to the floor 80 is a hollow apertured enclosure 132, commonly referred to as a doghouse (see FIGS. 3 and 4). Positioned within the doghouse 132 is an encapsulated magnet 134. The size of the magnet is less than that of the interior opening forming by the doghouse 132. The magnet 134 is selected to be of sufficiently light weight such that the magnet tends to float on the surface of the liquid which fills the sector 54 were it not for the doghouse 132. Secured in the underside of the floor subjacent the doghouse 132 is a member 135 carrying a reed switch 136, the terminals of which are attached to a pair of conductors 138 and 139. The reed switch 136, responsive to the position of the magnet 134, serves to apply a signal to the controller 40, which in turn controls the operation of the pump 128. In particular, during a rain operation when the liquid is drained from the sector 54, as the liquid drops below the level of the doghouse 132, the manet 134 drops against the floor 80. Consequently, the magnetic field in the proximity of the reed switch 136 increases. When the magnet 134 gets close enought to increase the field about the switch 136, the switch contacts change state and causes an electrical signal to be conducted through the conductors 138 and 139 to the electronic controller.

Figure 5:
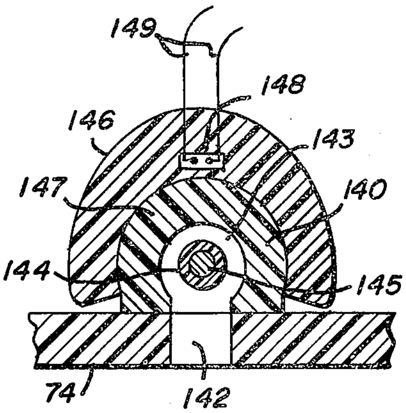
FIG. 5 is a cross-sectional plan view taken along the line 5—5 of FIG. 3 illustrating a level sensing mechanism.

The processing station 10 is further adapted to sense the elevation of fluid within each of the sectors 54–60. To realize this, a semiconical-shaped housing 140 defines a liquid level sensor channel 141 about the exterior of the front wall 74. The channel 141 is interconnected with the sector 54 through a plurality of apertures 142 within the front wall 74. The apertures 142, as illustrated in FIG. 3, are disposed at different elevations. Apertures 142 are positioned above and beneath the elevation of a stop 143 which protrudes inwardly from the front wall 74 at about the same height as the stop 98. The stops 98 and 143 are adapted to support an electrode as hereinafter discussed. Referring also to FIG. 5, disposed wherein the interior of the housing 140 is a floatable cylindrical member 144 encapsulating a magnetic body 145. The member 144 is adapted to move up and down within the housing 140 in accordance with the liquid level in the channel 141 and the sector 54. An outer resilient body 146 having a semicircular surface 147 conforming in shape to the outer surface of the housing 140 is mounted about the exterior of the housing 140. The body 146 is adapted to be slidably movable along the outer surface of the housing 140 such that it may be positioned at a select elevation. Encapsulated within the body 146 is a reed switch 148 having a pair of electrical conductors 149. The body 146 may be selectively positioned by the operator on the housing 140 to correspond to preselected liquid levels depending on the size and number of plates positioned within the sector. As the sector 54 is being filled with liquid, the liquid enters the interior of the housing 140 through the apertures 142. This causes the member 144 to rise. When the member 144 reaches substantially the selected elevation of the reed switch 148, the magnetic field associated with the magnetic body 145 causes the contacts of the switch 148 to actuate, thus causing an electronic signal to be developed on the conductors 149. This signal is sensed in the electrical controller 40, which in turn may generate an off-control signal to close the valve through which the liquid filling the sector is passing. As may be noted from FIG. 1, each sector 54–60 has its own independent sensor channel 141. Thus, each sector may be filled to the same or different levels of solution.

An electrode 150 is formed from a metallic screen having a relatively fine mesh is secured in a frame 151 of inert material which extends substantially along the entire length of the sector 54. Preferably, the electrode 150 is comprised of a type 316 stainless steel screen which is quite resistant to the acidic and basic solutions introduced into the sector 54 during processing. The frame 151 is positioned within the sector 54 against the stops 143 and 98 such that the electrode 150 lies in a plane substantially perpendicular to the walls 74, 76 and 77 above the fluid distribution tube 104. The frame 151 serves to both support the electrode 150 and one or more racks 71 within the sector 54. An electrical conductor 152, which is soldered to the electrode 150 connects the electrode 150 to the terminal 100.

A pair of screen electrodes 153 and 154 are formed in a rectangular pattern from a plurality of metallic strips preferably comprised of platinum plated titanium. The strips are arranged in a criss-cross pattern and configured in a generally planar shape. Each of the electrodes 153 and 154 are positioned within a pair of keepers 155 against the interior of the respective side walls 78. The electrodes 153 and 154 extend substantially that entire length of the sector 54 parallel to the walls 78 and perpendicular to the plane of the electrode 150. A pair of conductors 156 and 157 electrically connect the electrodes 153 and 154, respectively, to the terminals 99 and 101 to which is applied a direct current potential that is positive relative to the potential applied to the terminals 100. From the above, it will be seen that when a rack of plates 70 is positioned within a sector, that the planes of the electrodes 150, 153 and 154 are orthogonal to the plane of the plates 70 and consequently orthogonal to the plane of the emulsion layer 72 carried by the plates. Thus, no obstruction occurs in the regions within the boundaries defined by the planes of the electrodes. Accordingly, racks 71 carrying a plurality of parallel plates 70 may be mounted on the screen 151 so as to provide a means for simultaneously processing the plurality of plates 70 supported in the racks. A plurality of the racks 71 may be supported in each of the sectors. Depending on the size of the plates within the racks, each of the sectors may be filled to differing levels of solution.

Figure 7:
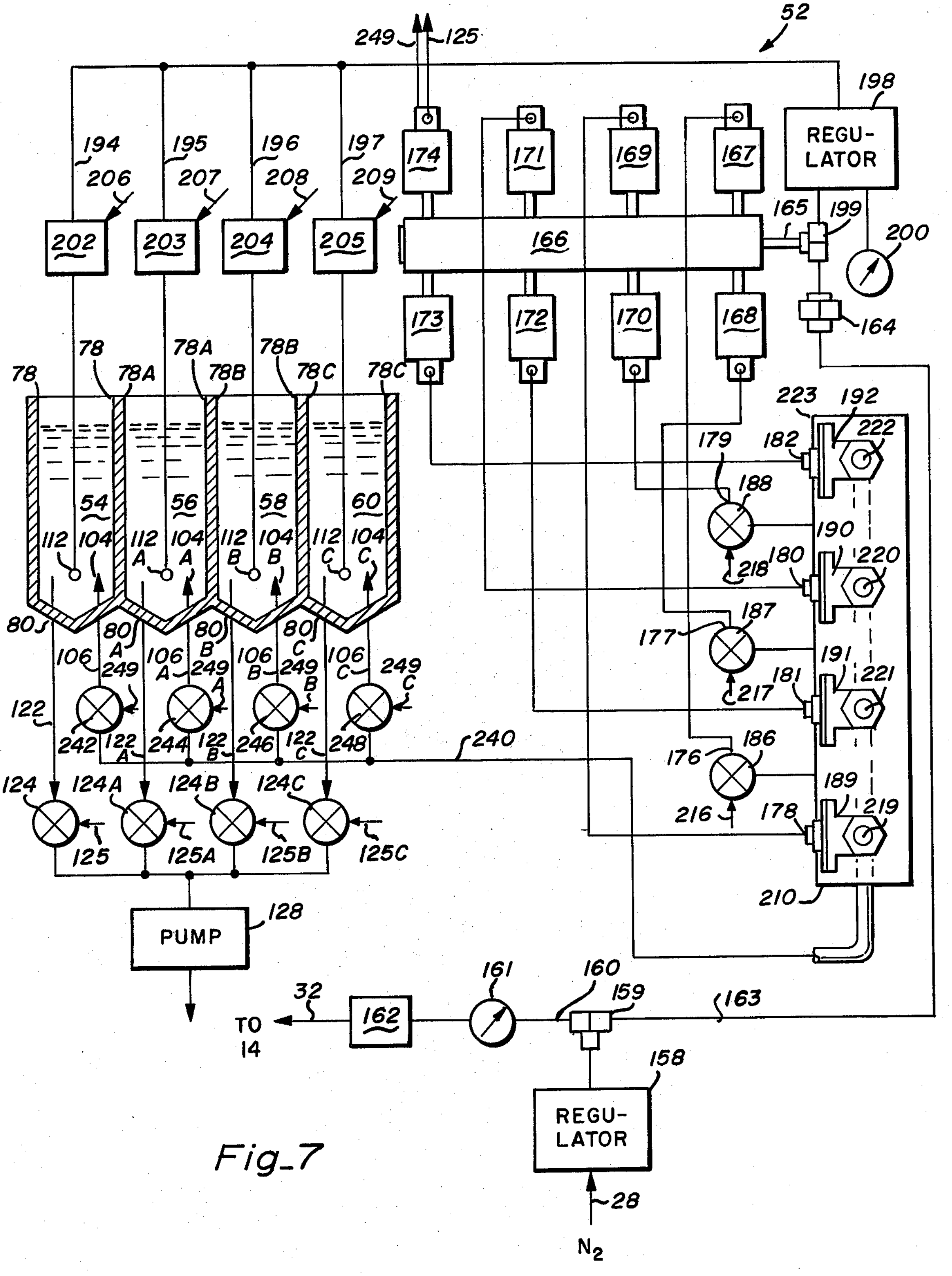
FIG. 7 is a schematic diagram of a hydraulic system for use in the processing station of FIG. 2.

The hydraulic system 52 of the processing station 12 is schematically illustrated in FIG. 7. As shown the system 52 is adapted to receive nitrogen gas ($N_2$) from a source (not shown) through the conduit 28. Conduit 28 is coupled to a pressure regulator 158 which serves to regulate the pressure of the nitrogen gas. Regulator 158 is joined to a T-joint 159, connected to a conduit 160, in turn connected to a pressure gauge 161; a solenoid valve 162 and the conduit 32 to supply nitrogen gas to the chemical supply station 14. By appropriate actuation of the solenoid valve 162, the chemical supply station 14 may be selectively pressurized with the nitrogen gas or disconnected from the processing system. The regulated nitrogen gas is also connected through a conduit 163 and a check valve 164 to an inlet 165 of a gas manifold 166. The check valve 164 is adapted to prevent nitrogen gas from leaking from the processing station 10 to the temperature control unit 12 or the chemical supply station 14.

Connected to the gas manifold 166 are a plurality of gas actuated control valves 167–174. The seven valves 167–173 are common for the entire system. However, the valve 174 represents eight valves which are used to control the filling and draining of the individual sectors 54–60 as hereinafter described. However, for purposes of convenience, only one valve 174 is shown. The six valves 167–172, as will be later described in more detail, control the operation of fluid valves which supply chemicals to a chemical mixing chamber while the control valve 172 controls a fluid valve adapted to control the supply of water to the mixing chamber. Each of the gas actuated control valves 167–174 are preferably three-way electrically actuated solenoid valves. In apparatus heretofore constructed according to the present invention, valves manufactured by the Predyne Corporation and designated as Predyne Model 83216 BB have been found to be desirable.

The outlets of the seven common control valves 167–173 are each connected by a gas conduit to a respective control port 176–182 of a liquid fluid control valve 186–192 so as to supply nitrogen at a raised pressure to control the opening and closing of fluid flow through the corresponding valves in turn controlling the supply of liquid to be provided to the four sectors 54–60. The valves 186–192 are all of similar structure and will be hereinafter described in greater detail in connection with FIG. 8. In addition to controlling the actuation of the seven fluid valves 186–192, the nitrogen gas is also supplied to the gas distribution hoses 112, 112A, 112B and 112C in the sectors 54–60, respectively, through a plurality of conduits 194–197. The four conduits 194–197 are connected to a pressure regulator 198 which is tied to the check valve 164 through a T-joing 199. The regulator 198 serves to accurately control the pressure of the nitrogen used to supply the nitrogen bursts through the hoses 112, 112A, 112B 112C during the processing operation. A pressure gauge 200 is coupled to the regulator 198 to provide an indication of the pressure at the regulator 198. Four electrically controlled solenoid valves 202–205 are connected intermediate the conduits 191–197 and the hoses 112, 112A, 112B and 112C, respectively. The valves 202–205 respectively have electrical terminals 206–209 respectively to receive control signals from the controller 40 to control the actuation and duration of the nitrogen bursts in the respective sectors 54–60.

The fluid control valves 186–192 include inlet ports 216–222. The inlet ports 216–222 are adapted to receive predetermined chemicals (or water) from the chemical supply station 14 and the temperature control unit 12 through the conduits 34 and 38 as shown in FIG. 1 and will be described in greater detail hereinafter. The outlet ports of the valves 186–192 extend to a chemical mixing manifold 223. The manifold 223 defines a chemical mixing chamber therewithin wherein mixtures of the liquid chemicals to be mixed may take place. Although not shown, the interior surface of the chemical mixing chamber is preferably smooth to preclude contaminants from collecting thereon. As illustrated, the seven valves 186–192 are physically positioned in a staggered, or offset, pattern. The physically staggering of the valves 186–192 has been found to alleviate the problem of fluid entering the manifold 223 through one valve from being directed into another of the valves and thus, alleviating the cross-contamination of the different chemicals with one another during photographic processing. It should be noted that check valves (not shown) may be included between the individual valves 186–192 and the manifold 223 as a further precautionary measure.

The outlet of the manifold 223 is connected through a conduit 240 to a set of four inlet fluid control valves 242, 244, 246 and 248, shown schematically, which control the filling of the respective sectors 54–60 with fluid. The valves 2 42–248 each has an input gas controlled port 249 to control actuation of the respective valve responsive to gas signals. The outlets of the four inlet fluid control valves 242–248 are joined to the pipes 106, 106A, 106B and 106C which are in turn connected to the respective liquid distribution tubes 104, 104A, 104B and 104C (see FIG. 3). Accordingly, the filling of the individual sectors 54–60 is individually controlled through the actuation of the four valves 242–248. Also, the respective drain hoses 122–122C are connected to the drain control valves 124–124C and in turn to the pump 128. Thus, draining of the individual sectors 54–60 is individually controlled through the actuation of the four valves 124–124C. Actuation of the fluid inlet control valves 242–248 and the drain control valves 124–124C is responsive to the gas controls of the previously described eight control valves 174 at their respective inlet ports 249 and 125. An individual gas controlled valve 174 is coupled to each of the ports 125–125C and 249–249C to provide independent control.

Figure 8:
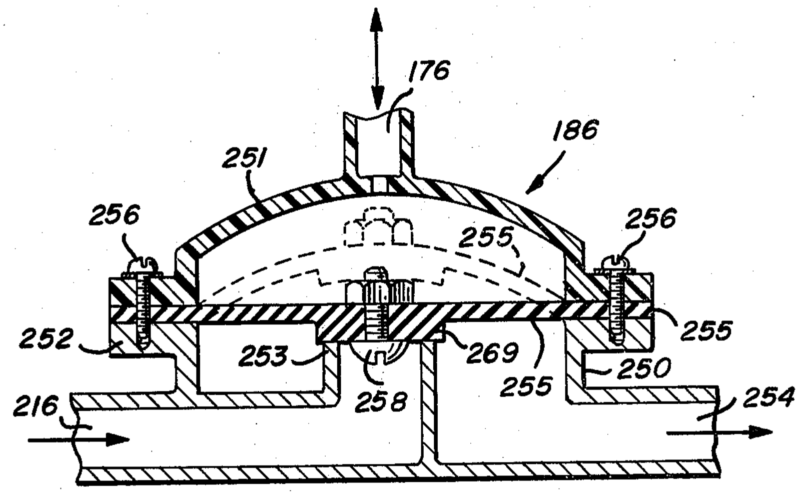
FIG. 8 is a cross-sectional view of a hydraulic valve for use in the hydraulic system of FIG. 7.

FIG. 8 illustrated the fluid valve 186 in a schematic cross-section view. As heretofore mentioned the valves 186–192 are of similar structure. The valve 186 comprises a housing 250 which includes a dome-shaped member 251 mounted over a chamber-defining member 252. The dome-shaped member 251 includes the control port 176 through which nitrogen gas is introduced and exhausted. The chamber-defining member 252 includes the inlet port 216, which terminates in an annular seat 253, facing the member 251. An outlet port 254 extends from the member 252. A flexible diaphragm 255 is disposed between the members 251 and 252, and secured in place by a plurality of screws 256 inserted around the periphery of the diaphragm. Another screw 258 secures a seal 259 to the diaphragm 255. Normally (as shown by the dashed lines), the seal 259 is spaced apart from the seat 253 such that fluid entering the inlet port 216 flows directly to the outlet port 254. However, when nitrogen gas is forced into the control port 176, a gas pressure is created against the topside of the diaphragm 255 which in turn urges the seal 259 against the seat 253 with a pressure sufficient to seal the seat. Thus, fluid flow through the valve is prevented. When the nitrogen gas pressure is relieved, the liquid entering the inlet port 216 acts on the bottom side of the diaphragm 255 whereby urging the diaphragm off the seat 253. With the diaphragm raised, fluid again flows through the valve. It has been found that the valve 186 may be formed by modifying a valve manufactured by the Richdel Corporation, and designated by them as Model R218 so as to include a diaphragm comprised of Viton material. It should be noted that the valve 186 is controlled by gas pressure and has no mechanically moving parts. The size of the valve 186 may be designed to accommodate various flow rates. In applications constructed for the system described herein, flow rates of approximately 30 gallons per minute have been utilized. The valve 186 may be comprised of chemically resistant material to avoid corrosion and deterioration by the processed chemicals. The illustrated valve may also be modified to permit it to be utilized as the drain control valves 124–124C. Such modifications include the insertion of a spring (not shown) within the seat 253 to prevent the diaphragm 255 from remaining in contact with the seat when the pump 128 is energized.

Figure 9:
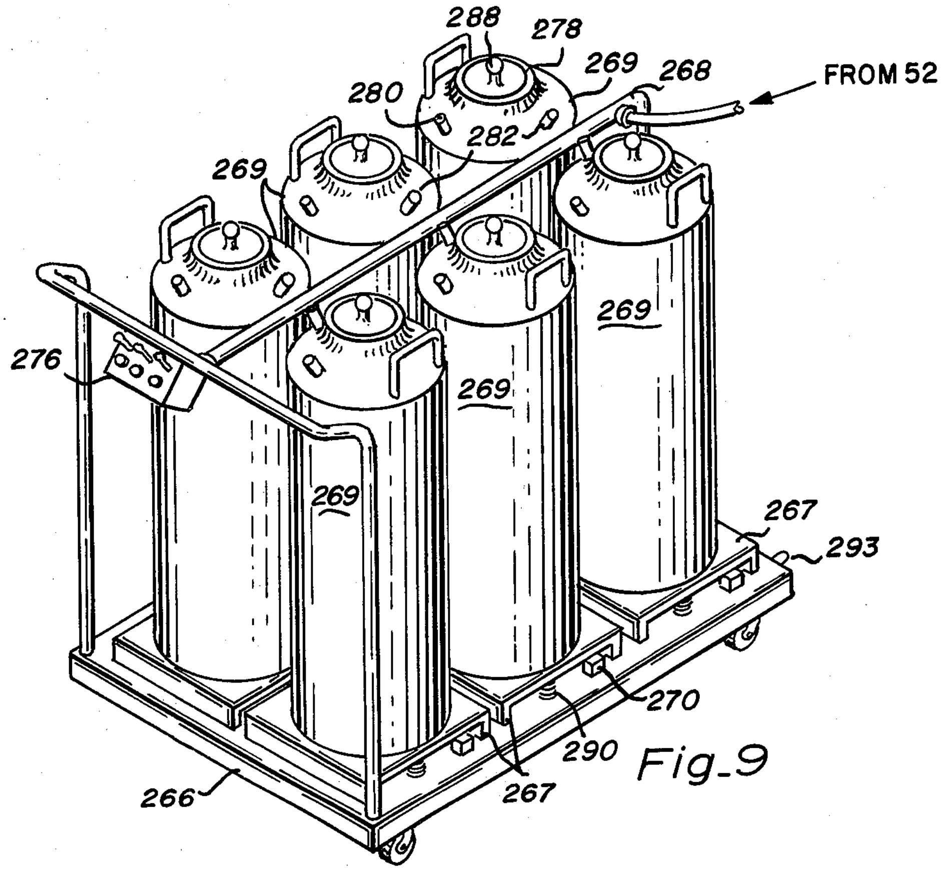
FIG. 9 is a perspective view of a chemical supply station.
Figure 10:
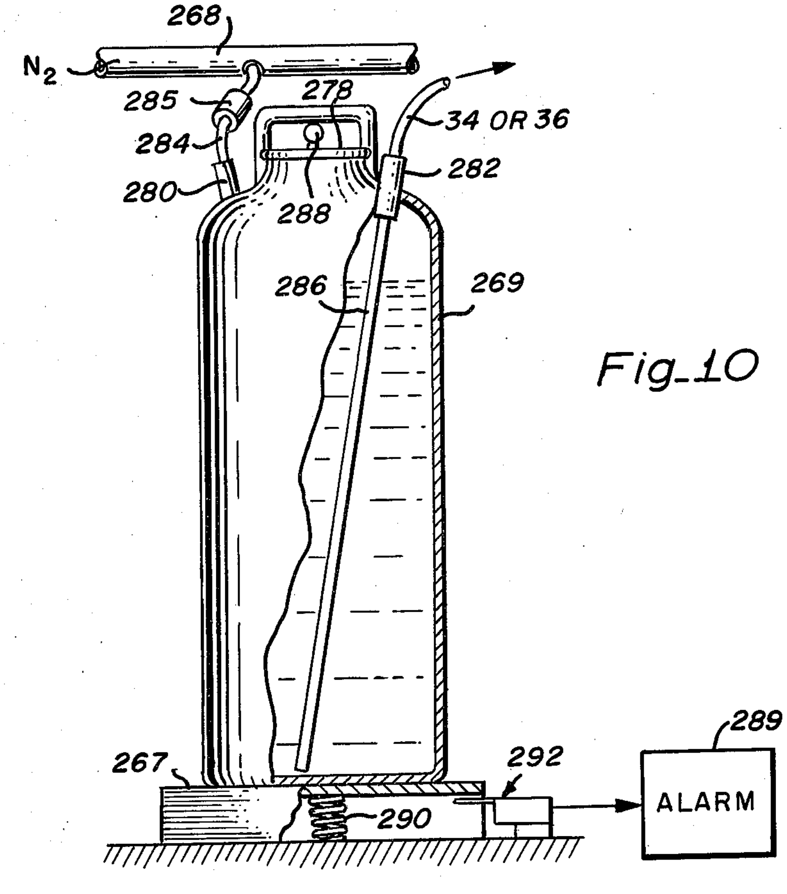
FIG. 10 is a perspective view of a chemical tank of the chemical supply station of FIG. 9 with portions of the tank broken away for clarity.

An embodiment of the chemical supply station 14 is illustrated in FIG. 9. The station 14 comprises a cart 266 having six platforms, each designated 267, mounted thereon. A manifold 268 for receiving nitrogen gas from the hydraulic system 52 is mounted on the cart 266. Disposed on each of the platforms 267 is a container 269. The containers 269 serve to hold concentrated quantities of the chemicals, such as developers, fixers and bleach, used in processing the photographic plates 70. As shown in FIG. 10, each of the containers 269 has a generally cylindrical shape and includes a lid 278. Extending through the top of the container 269 near the lid is an inlet port 280 and an outlet port 282. Outlet port 282 is coupled to either the conduit 34 or 36 depending on which chemical is contained therein. A hose 284 interconnects the manifold 268 with the inlet port 280 to receive a supply of nitrogen gas from the hydraulic system 52 to pressurize the container 269. A check valve 285, intermediate the port 280 and manifold 268, prevents nitrogen from leaking back into the hydraulic system 52 from the tank 269. A tube 286 extends from near the bottom of the container 266 to the outlet port 282 and serves to transport the pressurized chemicals from the container 269. A pressure relief valve 288 is positioned in the lid 278 to relieve pressure built up in the container 269 prior to removing the lid 278. Normally, the containers 269 are pressurized by the nitrogen gas so that a ready supply of chemicals are available at the temperature control unit 12 and at the fluid valves 186–191 of the processing station 10. When it is desired to remove one of the containers 269 from the cart 266 for filling, the nitrogen supply to that container is cut off, the pressure relief valve 288 is opened, and the lid 278 is removed.

In addition, it should be noted that the chemical supply station 10 includes level sensing devices associated with each of the containers 269 so as to actuate an alarm 289 when the level of the chemicals within the container becomes less than a predetermined quantity. Referring still to FIG. 10, each of the platforms 267 house a spring 290 therewithin which serves to continuously urge the platform upward. A microswitch, illustrated generally by the numeral 292, is selectively mounted on the cart 266 relative to the platform 267 such that as long as the weight of the container 269 is above a preselected quantity, which corresponds to the level of the chemicals therein, the miroswitch 292 remains closed. However, as the chemicals are used and the weight of the tank 269 becomes less, the spring 290 acts to remove the tank 269 upward. When the chemicals are used up to a predetermined value such that the spring 290 urges the container upward a corresponding amount, the contacts of the microswitch are actuated. This in turn causes an activation of the alarm 289. Preferably, the alarm is a visual indicator in the form of a light emitting diode which produces only a small amount of light so as not to impede the photographic development process. Though not shown, the chemical supply station may be enclosed within a cover. To control the supply of chemicals relative to whether or not the cover is in place, an interlock switch 293 is mounted at the rear of the cart 266 and serves to shut off a gas control valve (not shown) coupled to the manifold 268. Thus, when the cover is removed, passage of gas through the manifold 268 is prevented.

Figures 11, 12:
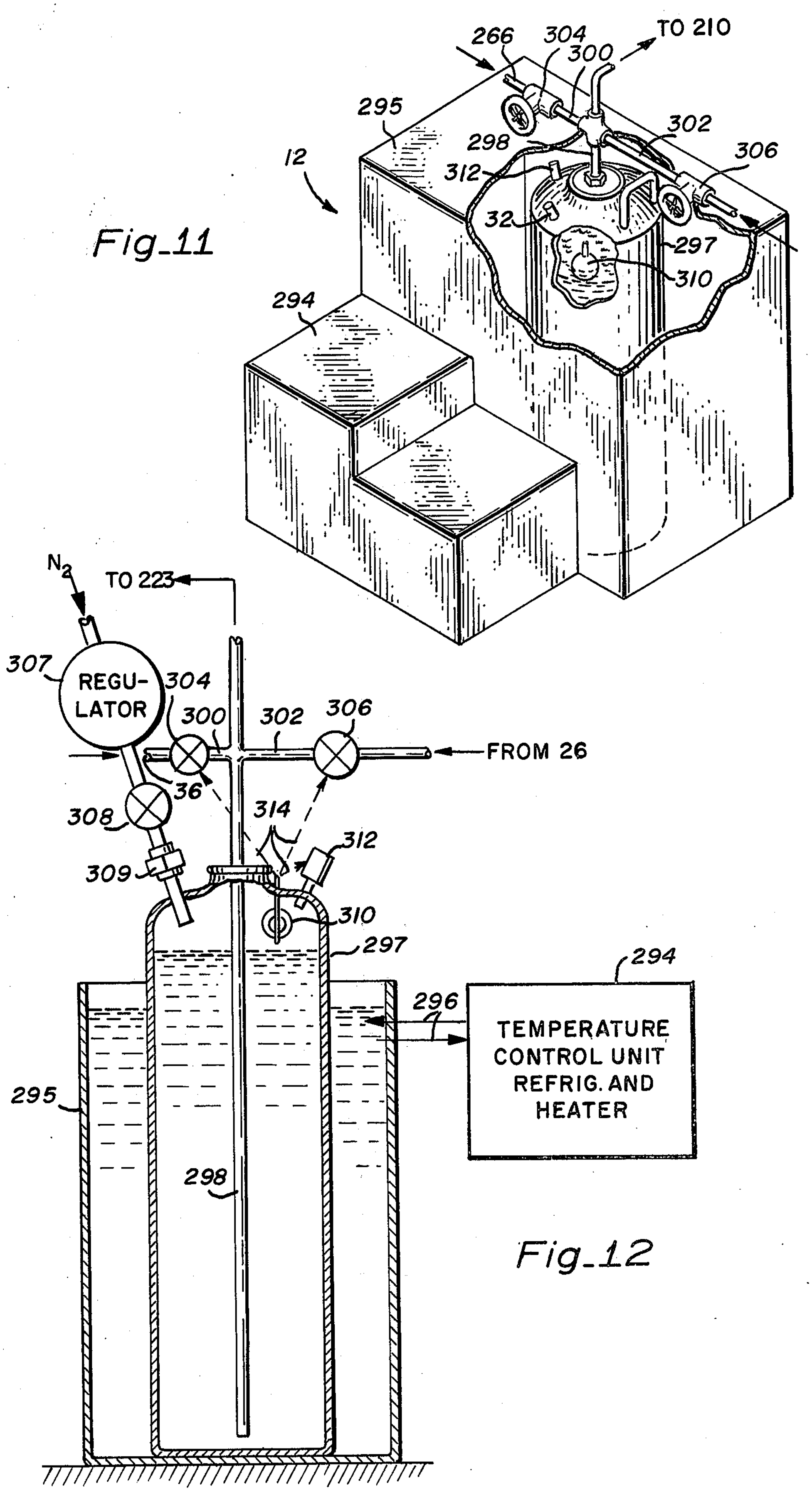
FIG. 11 is a perspective view of a temperature control unit.
FIG. 12 is a schematic diagram of a pre-mixing station of the temperature control unit of FIG. 11.

Referring now to FIGS. 11 and 12, the temperature control unit 12 is illustrated. As hereinfore described it is desirable to maintain the temperature of some of the chemicals to desired values. The unit 12 is adapted to provide such control and comprises a refrigerator and heater temperature control apparatus 294, and a water jacket 295 interconnected by a conduit 296. This apparatus allows for recirculation of water between the apparatus 294 and the water jacket 295. Continuous monitoring of the temperature may be maintained such that the temperature of the chemicals may be precisely controlled to a preselected value. The heater temperature control apparatus 294 may be of various forms commercially available. For example, the apparatus 294 may be one manufactured by Lauda, Inc., and designated as the Model K1R. The water jacket 295 may include two mixing tank containers 297 positioned herein. However, for purposes of clarity only one tank 297 is described in detail. A pipe 298 coupled to a pair of branches 300 and 302 extends through the lid of the container 297. A pair of gas controlled fluid valves 304 and 306 are disposed in the respective branches 300 and 302. The valve 304 is coupled to the conduit 36 from the chemical supply station 14 to control the quantities of developer concentrate received from one of the containers 269 of the chemical supply station 14. The valve 306 is coupled to the conduit 26 to control the quantity of deionized water. Thus, the two valves 304 and 306 may be controlled such that the proportion of chemicals and water to the container 297 may be controlled according to the preselected values. The resulting diluted mixture within the container 297 is consequently maintained at a constant controlled temperature. In order to transfer the mixture from the temperature control unit 12 to the chemical mixing chamber 223 in the processing station 10, a gas pressurization system is again utilized. In this system, the gas conduit 30 is coupled to the unit 12 to pressurize the container 297. A gas regulator 307 is coupled to the conduit 30 to regulate the pressure of the nitrogen. A solenoid 308 under control of control signals from the controller 40, is coupled to the regulator 307 and to a coupling 309 leading to the interior of the tank 297. Control of the solenoid 308 allows the flow of nitrogen to within the container 297 to be controlled. A float switch 310 is disposed within the container 297 and serves to sense the level of liquid therein. A solenoid-actuated valve 312 and the fluid valves 304 and 306 are coupled to the float switch 310 as indicated by the dashed lines 314. The float switch 310 in conjunction with control signals from the controller 40 is operative to control the valves 304 and 306 such that the valves shut off when the container 297 is filled. When the tank 297 is filled with the preselected mix of developer and water, the float switch 310 is actuated which generates a signal to close the valve 312. Thereafter, at the appropriate time, the solenoid valve 308 is actuated. Actuation of the solenoid 308 allows pressurization of the container 297 and forces the mixture of liquid chemicals out the pipe 298 to the chemical mixing chamber 223 within the processing station 10. Due to the continuous monitoring of the water in the jacket 295, the temperature of the mixed chemicals may be precisely maintained. Since it may be desirable to temper a second process chemical, i.e., second developer, the second container, similar to the container 297, is placed in the jacket 295. The providing of separate tanks provides assurance against cross-contamination of tempered solutions.

In operation, the six containers 269 of the chemical supply station 14 are filled with concentrated photographic processing chemicals. In the preferred embodiment, for processing masked integrated circuit plates, the container 269 are filled with an HRP developer, a D-8 developer, a pre-soak antihilation backing removal chemical, a fixer, a bleach and a clearing bath. The two containers 269 containing the concentrated developer chemicals are connected to the two containers 297 of the temperature control unit 12 where they are mixed with dionized water at the desired temperature to provide the desired working strength developer. The mixtures of chemicals from the containers 297 and the other chemicals contained in the containers 276 at the chemical supply station 14 are supplied through the conduits 38 and 34, respectively, to the fluid valves 186–191 of the processing station 10. The valve 192 at the processing station 10 receives water directly from the conduit 24. When it is desired to process a batch of the plates 70, a plurality of plates 70 are placed in one or more of the sectors 54–60. As seen, the electrodes 150, 153 and 154 form orthogonal planes defining a recess therebetween for receiving the racks 71 such that the bottom surface of the racks 71 rest on the electrode 150. Referring now to FIG. 6, a schematic diagram is shown which illustrates the mechanisms by which agitation is imparted to the chemical mixtures during the processing of the plates. The rack 71 is omitted from FIG. 6 for purposes of clarity and one of the plates 70 is illustrated in place for the processing operation. As known to those skilled in the art, when the exposed photographic element of the plate is immersed in the developer solution; the expoxed or image areas of the emulsion that contain exposed silver halide grains, are converted to metallic silver by a reduction-oxidation mechanism. The developer is oxidized, and, as development commences, there is an accumulation of salts in solution which are freed as a reaction product. This reaction product takes the form of small negatively-charged particles generally designated by reference numeral 400. The particles 400 accumulate adjacent the exposed or image areas 73 of the emulsion layer 72 in proportion to the size (or width) of the image size. In order to permit uniform development of the image areas 73, the electrodes 150, 153 and 154 are provided. The electrode 150 is connected to a negative source of DC potential and the electrode 153 is connected to a positive source of DC potential. The electrode 150, when energized electrolyzes the developer to produce or generate hydrogen bubbles 406 which flow upwardly in planes closely adjacent the face of the plate 70 that carries the emulsion layer 72. The gaseous hydrogen bubbles are fine (approximately one twenty-fifth the size of bubbles generated by nitrogen bubbles) and evenly and closely spaced. In operation, when the negatively-charged waste particles 400 begin to accumulate adjacent their exposed image areas 73, the electrodes are energized. The bubbles 406 thereby scrub the emulsion face, breaking loose or dislodging the particles 400. Simultaneously, the electrodes 153 and 154 attract the particles, drawing them away from their initial location adjacent the image areas. This permits additional, fresh developer to displace the particles adjacent the image areas, thereby permitting development to continue. The agitation resulting from this combination of electrolytic and electrophoretic action is responsive to the number of particles generated. However, in those process steps such as in fixing where negative particles are not formed, agitation is provided by the nitrogen burst mechanism wherein nitrogen gas is emitted through the openings 116 in the hose 112, the released nitrogen bubbles up through the solution, and thereby agitate the fixer.

Generally, in the processing of photographic plates, the first operation is a wash operation. Assuming that the plates to be processed are placed in sector 54, the wash operation commences when the controller 40 applies the appropriate electrical control signal to the solenoid valve 173 which controls the supply of nitrogen to the control port 182 of the fluid control valve 192. The controller 40 also generates a signal causing the fluid valve 242 to open. Since the inlet port 222 of valve 192 is connected to the source of deionized water through the line 24, deionized water is caused to flow through the chemical mixing chamber 223, into the sector containing the plates and out through the openings 109 in the distribution tube 104. During the washing operation the liquid level sensor is not activated so that the level of the washing solution may reach the height of the weir 102. When the level of the water reaches this height it overflows the weir 102 and passes through the spillway passageway and out through the conduit to the drain 103. During the washing operation, the valve 242 is retained open for approximately 1 minute. The next operation is the drain operation for draining the wash solution from the sector 54. At this point, the controller generates signals to close the valves 192 and 242, open the drain valve 124 and energize the pump 128. Opening of the valve 124 and energizing the pump 128 actuates draining of the deionized water from the sector 54. It should be noted that with liquid in the sector 54, the encapsulated magnet 134 of the drain sensor 132 floats and consequently is out of contact with the floor 80. However, as the drain operation nears completion, the magnet 134 comes to rest on the floor 80 at which time the reed switch 136. is opened. The opening of the reed switch 136 is sensed by controller 40 which in turn generates an electrical signal to turn off the pump 128. If plates to be processed are placed in the other sectors 56 or 58 and/or 60, the washing operations, as well as all other operations, in those sectors may be conducted simultaneously and controlled by control signals from the controller 40.

The next operation is the developing step. During this step, with the plates remaining in place in the sector 54, the sector is filled with HRP developer from the container 297 in the temperature control unit 12. To fill the sector 54, the controller 40 generates a control signal to actuate the solenoid valves 172 and 174 which release nitrogen to open the fluid valves 191 and 242, respectively. When the level of the HRP developer within the sector 54 reaches the preselected level of the established by the preset position of the reed switch 148 in the body 146 on the liquid level sensor housing 140, the encapsulated magnet 145 causes the switch 148 to open. Opening of the switch 148 causes a signal to be sent to the controller 40 which in turn generates a responsive signal to cause closing of the valves 242 and 191. It should be recognized that by appropriate adjusting the position of the slidable body 146 to a level just above the surface of the plates 70, chemicals may be conserved. It should be recognized that although the volume of fluid may vary depending upon the number of plates processed, the level sensing feature is independent of the number of plates processed. It should further be recognized that the preset level may be different for each of the sectors 54–60 and that each may be filled simultaneously to a level independent of the level of the other sectors. Typically, the HRP developer solution is retained in the sectors for approximately 5 min utes to perform the developing operation. As previously discussed, the electrolytic and electrophoretic agitation mechanism is generally employed during the developing operation. During development, the electrical power to the electrodes 150, 154 and 156 is cycled on and off at predetermined intervals so as to continually dislodge the ionized particles from the emulsion 72 and therby provide fresh supply of developer in the neighborhood of the emulsion layer. At the end of the development step operation, the controller generates signals to control valves so as to force water into the sector 54 in a manner as previously described. The introduction of the water gradually forces the developer over the weir 102 and into the spillway such that the entire batch of plates is developed for the 5 minute period. The drain operation is then once again performed thereby completing the development step.

Following developement step, the fixing step takes place. In this step, the fluid valves 186, 192 and 242 are opened, responsive to appropriate control signals originating with the controller 40. Opening of the valves 186, 192 and 242 allow for the transfer of a metered mixture of the fixer and deionized water from the chemical mixing chamber 223 to the sector 54. Again the preselected level is established for the sector. The fixer mixture fills the sector to the desired level with the plates 70 in their original position and is retained therein for approximately 3 minutes. During the fixing step the nitrogen burst agitation is conducted to agitate the solution about the plates 70. The nitrogen burst agitation is controlled by control signals from the controller 40 delivered to the terminal 206 of the valve 202. At the end of 3 minutes, the solenoid valve 202, responsive to control signals, is turned off. The valves are controlled to permit water to enter the sector through the valve 242 and force the fixer over the weir as previously described.

After completion of the fixing step a wash step is performed during which nitrogen burst agitation is used. This wash step, which is generally approximately 4 minutes, is followed by another drain operation. This concludes the processing of the plates 70, and the racks 71 are removed from the sectors. Then the racks and plates are generally taken to a dryer.

It may be noted, that by forcing the developing and fixing solutions from the sector by introducing water at a controlled rate, all the sections of the plates within the sector are subjected to the solutions for the same period of time. As will be understood by the previous description of the process, the developing, fixing, and wash cycling of a batch of plates takes place in a single sector, while the plates stay in place. This is advantageous as it minimizes processing errors and also minimizes the safety hazards since it is not necessary to handle the plates. The use of the several sectors enables glass plates of several different sizes to be processed simultaneously in a manner that conserves the use of the relatively expensive chemicals.

With the apparatus described, mixing and dilution of the concentrated chemicals occurs within the chemical mixing chamber within the processing station. Consequently, the apparatus is relatively compact. Moreover, with this configuration the chemical supply station and the temperature control unit may be remote from the processing station.

Although not described, it should be recognized by those skilled in the art that accurate photographic processing is accomplished by controlling time, temperature, chemical concentration and agitation, and that the program in the electronic controller 40 may be changed to control the sequence and timing of operations when additional chemicals are needed such as would be the case in color or reversal processing. Moreover, the present invention may be used to automatically process sheet film using electrophoretic and electrolytic action as explained previously.

From the above, it will be seen that there has been provided an apparatus for processing photographic masks which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for simultaneously processing a plurality of emulsion coated photographic plates, comprising:

- a processing tank having a bottom wall and side walls, the processing tank being adapted to hold a supply of processing fluid for processing emulsion coated plates when said plates are disposed within the tank in a position to subject the plates to said fluid;
- first electrode means disposed within said tank, the first electrode means being positioned within the interior of the tank along a first horizontal plane adjacent to the bottom wall such that when a supply of liquid is held by the tank, the first electrode means rests beneath the surface of said supply of fluid and is substantially parallel to the surface of said fluid;
- second electrode means disposed within said tank adjacent the side walls at an elevation above the first electrode means and in a second plane substantially perpendicular to said first plane;
- means for receiving and positioning a plurality of said photographic plates in parallel tandem relationship to each other and within said tank above the first electrode means, lateral to the second electrode means with the plane of said plates being substantially normal to the plane of each of said first and second electrodes; and
- means for applying potential of a first polarity to said first electrode means and a potential of opposite polarity to said second electrode means.

2. Apparatus for simultaneously processing a plurality of emulsion coated photographic plates as recited in claim 1 and further comprising a third electrode means disposed within said tank adjacent the side walls at an elevation above the first electrode means, the third electrode means lying along a third plane substantially parallel to said second plane and substantially perpendicular to said first plane; means for applying a potential of said opposite polarity to said third electrode means; said first, second and third electrode means forming a recess for receiving said plurality of plates such that the plane of said plates is orthogonal to each of said first, second and third electrodes.

3. Apparatus for simultaneously processing a plurality of emulsion coated photographic plates as recited in claim 1 and further comprising a first valve control means for controlling the filling of said tank with a supply of said processing fluid; and sensing means responsive to the level of said fluid within said tank and operative to control said valve control means responsive to the level of fluid within said tank.

4. Apparatus for simultaneously processing a plurality of emulsion coated photographic plates as recited in claim 1 and further including second valve control means for controlling the draining of said fluid from said tank; and sensing means responsive to the level of said fluid within said tank and operative to control said second valve control means responsive to the level of fluid within said tank.

5. Apparatus for simultaneously processing a plurality of emulsion coated photographic plates as recited in claim 1 wherein said tank is comprised of a front wall, a pair of side walls, and a spillway wall, said spillway wall having a top surface that is disposed below the top surfaces of said front and side walls so as to define an egress for said fluid when it overflows said spillway wall, and means forming a passageway for draining said overflow fluid.

6. Apparatus for simultaneously processing a plurality of emulsion coated photographic plates as recited in claim 1 wherein said apparatus comprises a plurality of processing tanks, each tank having a first electrode means, a second electrode means, a first valve control means for controlling filling of the associated tank with a supply of said processing fluid, said first valve control means being responsive to fluid control signals and operative to allow fluid to pass therethrough into a preselected one of said respective tanks, a supply valve control means for supplying fluids to said first valve means, and means for selectively applying a fluid control signal to said first valve means.

7. Apparatus for simultaneously processing a plurality of emulsion coated photographic plates as recited in claim 1 and comprising a manifold defining a chemical mixing chamber therewithin, conduit means coupling said manifold and said tank for supplying fluid to said tank, a plurality of fluid control valves, each of said fluid control valves being responsive to a fluid control signal and operative to supply a predetermined fluid to said manifold, and means for selectively supplying a fluid control signal to said plurality of fluid valves.

8. Apparatus for simultanaeously processing a plurality of emulsion coated photographic plates as recited in claim 7 wherein each of said plurality of fluid control valves includes an outlet port connected to said manifold, said outlet ports being arranged in a staggered pattern such that fluid supplied by one of said fluid valves is not directed into the outlet port of another of said fluid valves, thereby tending to prevent cross contamination of said fluids.

9. Apparatus for simultaneously processing a plurality of emulsion coated photographic plates as recited in claim 7 including a plurality of first containers for holding preselected fluids therewithin, each of said first containers including an inlet and an outlet, first conduit means for coupling said outlets to respective ones of said plurality of fluid valves, and means for applying a pressure through said inlets to said preselected fluids within said plurality of first containers such that said preselected fluids are forced through said conduit means to said fluid valves.

10. Apparatus for simulaneously processing a plurality of emulsion coated photographic plates as recited in claim 9 wherein said first conduit means includes means for controlling the temperature of at least one of said preselected fluids.

11. Apparatus for simultaneously processing a plurality of emulsion coated photographic plates as recited in claim 10 wherein said means for controlling the temperature includes a water-filled jacket, a second container disposed within said jacket, and means for sensing and adjusting the temperature of said water to a preselected value.

12. Apparatus for simultaneously processing a plurality of emulsion coated photographic plates as recited in claim 11 and further comprising means for supplying a second fluid to said second container, said second fluid and at least one other fluid forming a mixture within said container, means responsive to the level of said mixture within said second container and operative to shut off the supply of said at least one other fluid and said means for supplying a second fluid, and pressure means for applying a pressure to said mixture so as to force said mixture to a preselected one of said fluid valves.

13. Apparatus for simultaneously processing a plurality of emulsion coated photographic plates which are positioned in a rack comprising:

a processing station including a processing tank for holding a plurality of preselected fluids, a first electrode means disposed within said tank and lying down along a first plane substantially horizontal in alignment and passing over a lower portion of said tank, said first electrode means adapted to support a rack carrying a plurality of photographic plates, a second electrode means disposed withins said tank and lying along a second plane substantially perpendicular to said first plane and passing along a side portion of said tank, means disposed in the bottom portion of said tank for filling said tank with preselected fluids, means responsive to the level of fluid within said tank and operative to control said means for filling when said fluid reaches a first predetermined level, means for draining fluid from said tank, means responsive to the level of said fluid within said tank and operative to control said means for draining when said fluid reaches a second predetermined level, and a chemical mixing chamber for selectively mixing said predetermined fluids and for supplying said mixed fluids to said means for filling;

a chemical supply station including a plurality of first containers for holding said preselected fluids therewithin, each of said first containers including a first inlet and a first outlet, and a first conduit means for coupling at least one of said first outlets to said chemical mixing chamber;

a temperature control unit including a water-filled jacket, a second container disposed within said jacket and having a second inlet and a second outlet, means for sensing and adjusting the temperature of said water to a preselected value, second conduit means for coupling one of said first outlets to said second inlet;

means for applying a pressure within said first and second containers through said inlets such that when fluids are disposed therein the fluids are forced out said respective first and second outlets and through said first and second conduit means to said chemical mixing chamber; and means for applying a negative potential to said first electrode means and a positive potential to said second electrode means, whereby when a developer fluid and said plates are disposed within said tank, the developer fluid produces negatively charged waste particles at image sites on the emulsion coated plates, and whereby said potentials cause said developer fluid to be electrolyzed and to release hydrogen bubbles beneath said plates which migrate upwardly through said developer fluid and between said plates randomly contacting and dislodging particles being attracted towards their second electrode means whereby continually refreshing the developer fluid disposed proximate said image sites.

14. Apparatus for simultaneously processing a plurality of emulsion coated photographic plates as recited in claim 13 wherein said processing station includes third electrode means disposed within said tank beneath the surface of said fluid and lying along a third plane substantially parallel to and opposite said second plane, perpendicular to said first plane, and passing along a side portion of said tank; and means for applying a positive potential to said third electrode means, said first, second and third electrode means forming a recess for receiving said rack means such that the plane of said plates is orthogonal to said electrodes.

* * * * *

FO-1050
(5/69)

UNITED STATES PATENT OFFICE
CERTIFICATE OF CORRECTION

Patent No. 3,911,460 Dated October 7, 1975

Inventor(s) Daniel J. Lasky, Allen T. Puder, Philip Richard Wright, George Oiye

It is certified that error appears in the above-identified patent and that said Letters Patent are hereby corrected as shown below:

Column 2, line 49, "perature" should read --peratures--;

Column 3, line 48, "reciving" should read --receiving--;

Column 5, line 13, delete "77" (first occurrence) and substitute therefor "76";

Column 5, line 50, "forming" should read --formed--;

Column 5, line 61, "rain" should read --drain--;

Column 5, line 63, "manet" should read --magnet--;

Column 6, line 17, delete "wherein" and substitute therefor --within--;

Column 7, line 10, "terminals" should read --terminal--;

Column 7, line 54, delete "172" and substitute therefor --173--;

Column 8, line 11, "T-joing" should read --T-joint--;

Column 8, line 19, delete "191-197" and substitute therefor --194-197--;

Column 9, line 32, delete "whereby" and substitute therefor --thereby--;

Column 10, line 32, "miroswitch" should read --microswitch--;

Column 10, line 66, delete "K1R" and substitute therefor --K2R--;

Column 11, line 1, "herein" should read --therein--;

Column 12, line 28, delete "size" (second occurrence) and substitute therefor --area--;

Column 13, line 26, after "by" insert --the--;

Column 13, line 41, delete "of the" and substitute therefor --as--;

Column 16, line 56, after "said" insert --first--;

Column 17, line 30, after "with" insert --said--;

Column 18, line 28, delete "their" and substitute therefor --said--;

Column 18, line 28, delete "whereby" and substitute therefor --thereby--.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*